March 2, 1937.   G. D. ROEDELS   2,072,532
ADMISSION TICKET CHECKING APPARATUS
Filed May 14, 1935   7 Sheets-Sheet 1

INVENTOR
George D. Roedels
BY
ATTORNEY

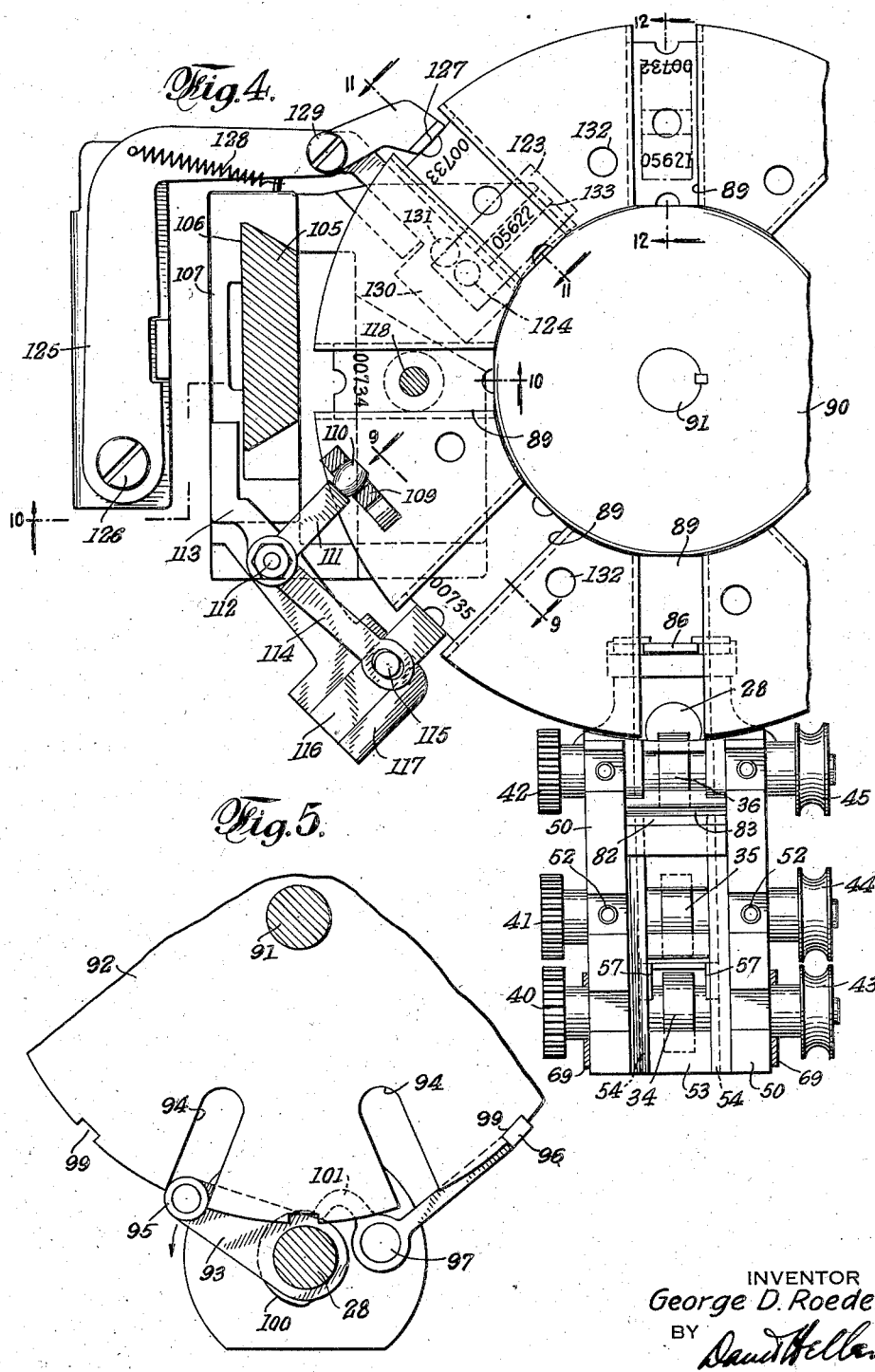

March 2, 1937. G. D. ROEDELS 2,072,532
ADMISSION TICKET CHECKING APPARATUS
Filed May 14, 1935 7 Sheets-Sheet 4
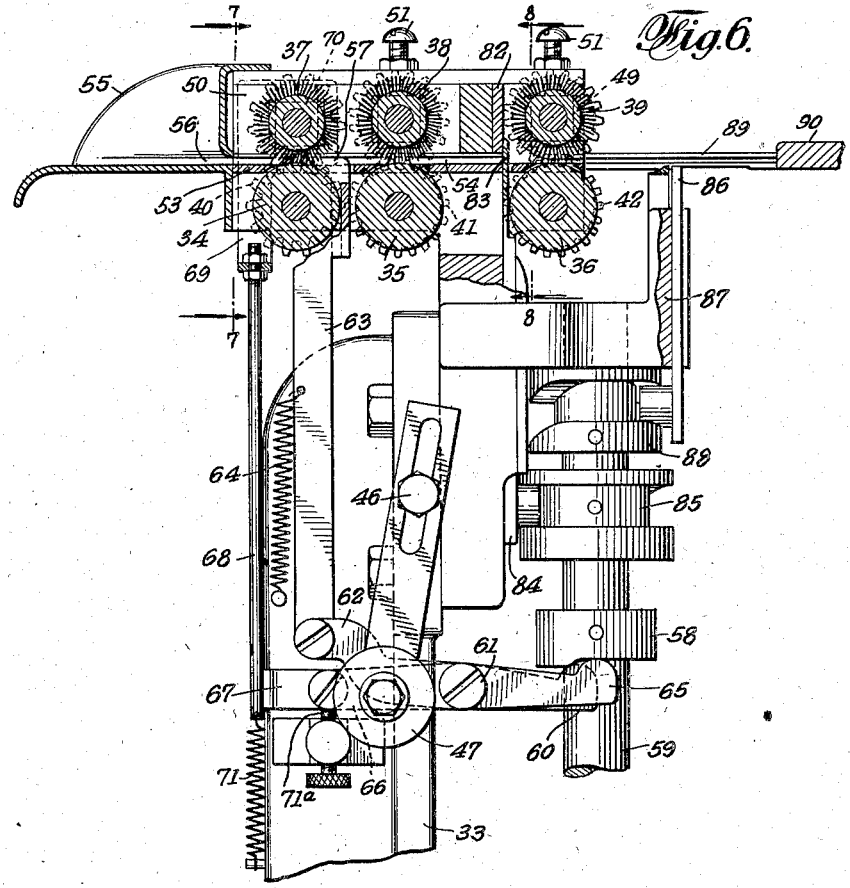
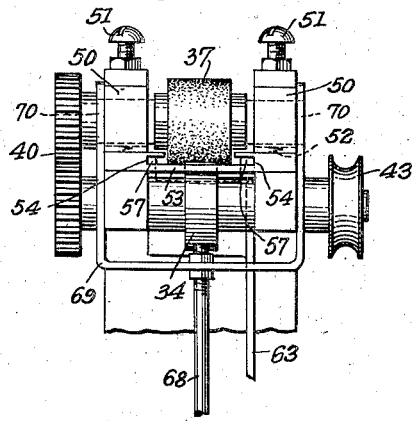
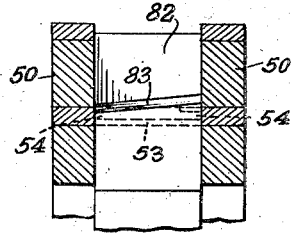
INVENTOR
George D. Roedels
BY
ATTORNEY March 2, 1937.　　　G. D. ROEDELS　　　2,072,532
ADMISSION TICKET CHECKING APPARATUS
Filed May 14, 1935　　　7 Sheets-Sheet 5

INVENTOR
George D. Roedels
BY
ATTORNEY

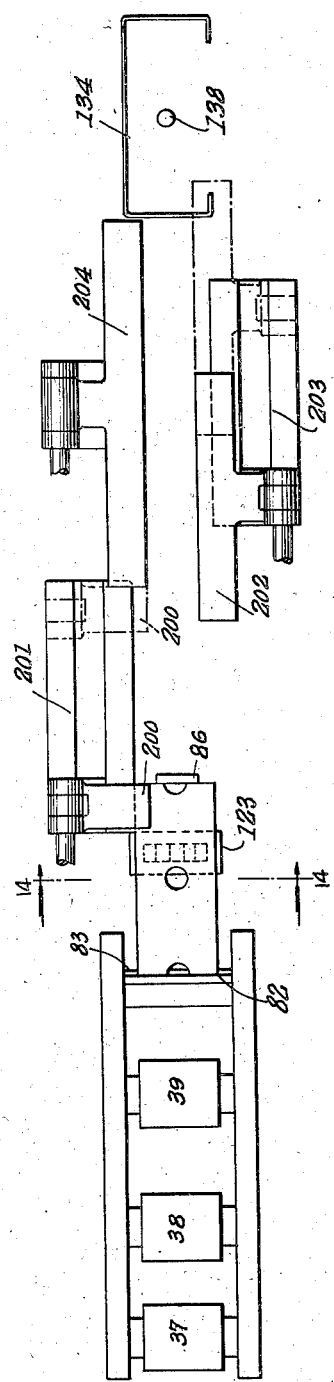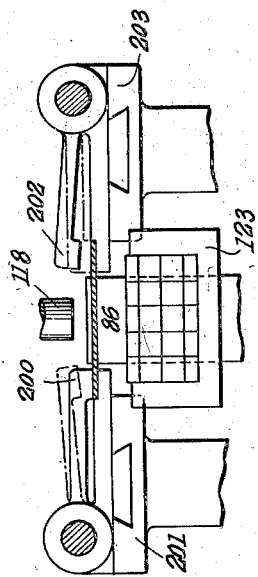

Patented Mar. 2, 1937

2,072,532

UNITED STATES PATENT OFFICE 2,072,532

ADMISSION TICKET CHECKING APPARATUS

George D. Roedels, New York, N. Y., assignor to Bell Punch Company, Ltd., London, England Application May 14, 1935, Serial No. 21,345

12 Claims. (Cl. 101—78)

The present invention relates to machines for cancelling and checking strip tickets as employed in theatres, and is an improvement on my Patent No. 1,964,215.

The general objects of the invention are clearly set forth in that patent, particularly as relating to the concelling of the ticket by punching a hole therethrough and by supplying said ticket with a number or the like comparable with the serial number on said ticket.

While the present disclosure does not contemplate the employment of means for issuing a coupon for each ticket inserted therein for cancelling, it is understood that means such as disclosed in the above-mentioned patent may be employed as described in said patent.

The present invention contemplates the provision of a machine for efficiently and surely handling a ticket in such a manner as to provide it with a substantially central hole and with a number comparable with the serial number of the ticket, each being successively provided.

The invention further contemplates the provision of improved feed means for the ticket, and timing means for insuring the proper advancement of said ticket from said feed means to its ultimate reception in a storage chute or receptacle.

The invention also contemplates the provision of a signal to apprise the attendant that the particular receptacle which is receiving the cancelled tickets, is approximately full.

The invention further contemplates the provision of means manually operable for selectively positioning one of a multiplicity of receptacles into position to receive tickets cancelled by the machine.

The foregoing and other objects such as the provision of means to retard the advancement of an incoming ticket so it may not enter the machine during its cycle of operation but only at the end thereof; the provision of means for definitely positioning a ticket so all of said tickets will be similarly treated; the provision of means for operating the number imprinting mechanism only when a ticket is in position to receive said imprint; etc., will become more apparent from the following detailed description of the preferred embodiments of the invention, illustrated in the accompanying drawings, and in which:—

Fig. 4 is an enlarged plan sectional view, partly broken away, and more clearly showing the operation stations of the machine.

Fig. 5 is a fragmentary plan sectional view of the means for indexing the ticket from station to station.

Fig. 6 is a fragmentary elevational view, partly in section, of the ticket feed means and the mechanism for controlling the movement of said ticket therethrough.

Fig. 7 is a vertical sectional view as taken along the line 7—7 of Figure 6.

Fig. 8 is a similar view as taken along the line 8—8 of Figure 6.

Fig. 13 is a semi-diagrammatic top plan view of an alternate form of machine for the purpose, the path of the ticket being arranged in a straight line.

Fig. 14 is an enlarged cross-sectional view as taken along the line 14—14 of Figure 13.

Figure 1:
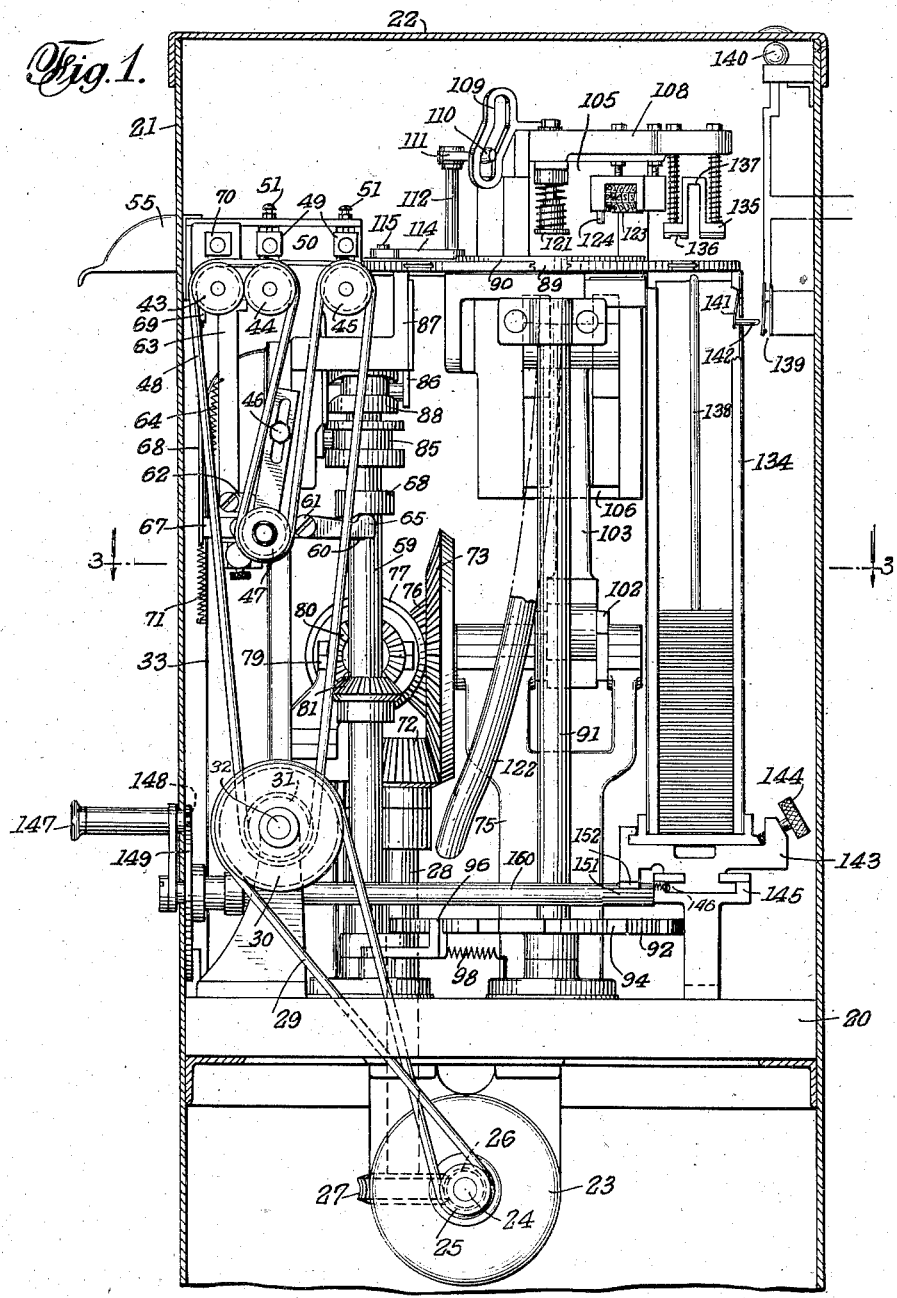
Fig. 1 is a side elevational view of a preferred mechanism for handling strip tickets as contemplated in the present invention, a casing or cabinet therefor being shown in section.

Figs. 15, 16, 17, 18, and 19 are semi-diagrammatic plan views which together with Figure 13 indicate the successive "step by step" movement of a ticket from the ticket feeding means to its ultimate position in a receiving receptacle.

Referring to the drawings and particularly to the form of the invention illustrated in Figures 1 to 12 inclusive, the mechanism employed herein is carried by a base plate 20 preferably removably supported in a cabinet or casing 21, the top 22 of which may be readily removable for ready access to the top of the mechanism. The cabinet 21 may also be provided with removable panels or doors so ready access may be had to any portion of said mechanism.

The base 20, preferably on its under face, carries an electric motor 23, the shaft 24 of which is provided at one end with a grooved pulley 25 and at the other end with a worm 26 meshing with a worm wheel 27 on the vertical shaft 28.

By means of a belt 29, the motor through the medium of its grooved pulley 25 drives a somewhat larger grooved pulley 30. Fixed to a shaft 32 is a pulley 31 smaller than the pulley 30. In this manner the motor 24 may impart rotation to the pulley 31 at a rate of speed determined by the proportions of the said several pulleys.

The ticket receiving and feeding mechanism, best shown in Figures 1 and 6, is supported upon a bracket 33 and includes the feed wheels 34, 35, and 36 successively positioned in the line of movement of a ticket.

Immediately above each of these wheels is positioned a cooperating rotary brush, respectively designated 37, 38, and 39. Each pair of feed means, (a wheel and a brush), are geared together as at 40, 41, and 42, the gears 40 however having somewhat deeper teeth for the purpose later apparent.

The shafts which carry the wheels 34, 35, and 36 are each respectively provided with a grooved pulley 43, 44, and 45, and adjustably secured to the bracket 33, as at 46, there is provided a similar grooved pulley 47. A belt 48 is arranged around the pulley 31, pulleys 43 and 44, as a depending loop around the pulley 47, and over the pulley 45. In this manner the rotation imparted to the pulley 31 is transmitted by means of the pulleys 43, 44, and 45 into the feed wheels 34, 35, and 36, all of which rotate at a uniform rate of speed. Due to the gearing arrangement previously described the brushes 37, 38, and 39 rotate at a similar rate of speed but in the opposite direction.

The shafts which bear the brushes 38 and 39 are preferably mounted in slide blocks 49 in slideways in the spaced walls 50. These slide blocks 49 may be adjusted by the screw means shown at 51 against spring means 52 positioned in the bottom of each of said slideways. In this manner the desired ticket driving relation between the brushes 38 and 39 and their respective feed wheels may be attained.

A ticket guide platen 53 is arranged between the pairs of driving wheels and brushes, and is provided with center cut-out portions through which said feed wheels may slightly protrude as shown in Figure 6. The side edges of the platen 53 are preferably provided with ticket guide means 54, as best shown in Figure 7. The incoming end of the platen is provided with a ticket receiving member 55 having a throat portion 56 in alignment with the ticket guide means 54 and with the platen 53.

Since it is desirable to start a ticket through the machine only when the mechanism is prepared to receive it for proper passage therethrough, there are provided at 57 abutments in the path of the guideways 54 so an incoming ticket is retained in position against said abutments until freed for passage by the withdrawal of said abutments. This is accomplished through the medium of a cam 58 on the cam shaft 59 which engaged one arm 60 of a lever pivoted at 61 to the bracket 33, the other arm 62 of said lever being connected to the member 63 which carries the abutments 57. When the arm 60 is on the high part of the cam, as shown in Figure 6, the abutments 57 are in the path of an incoming ticket to prevent its passage. When the arm 60 is on the lower part of the cam the spring 64 depresses the abutments 57 so the ticket may be fed by the brush 37 and its cooperating feed wheel 34.

At the time when the abutments are raised the brush 37 is raised out of contact with the feed wheel 34 so another ticket may not be inserted "in out of time" relation with the machine. The movement of this brush is accomplished through the medium of the same cam 58, which acts on the arm 65 of a lever also pivoted at 61 and having an arm 66 pivoted to a bracket 67 fixed to a rod 68 adjustably secured to a forked member 69. This member 69 is provided with openings in which are positioned a portion of the slide blocks 70 carrying the shaft for the brush 37. When the arm 65 is on the low part of the cam the spring 71 serves to pull the rod 68 down, and through the engagement of the forked member 69 with the slide blocks 70, pulls the brush 37 down against and in contact with feed wheel 34. When the arm 65 is on the high part of the cam 58, the tension of the spring 71 is overcome and the brush 37 is sufficiently spaced from its feed wheel 34 to prevent the feeding of a ticket therebetween.

In this simple manner a ticket placed in the receiving member 55 for passage through the machine will not start its passage therethrough until such time as the machine is ready to receive it.

An adjustable stop such as shown at 71a may be employed for nicety of control of the movement of the arm 66 as operated by the cam 58.

Figure 3:
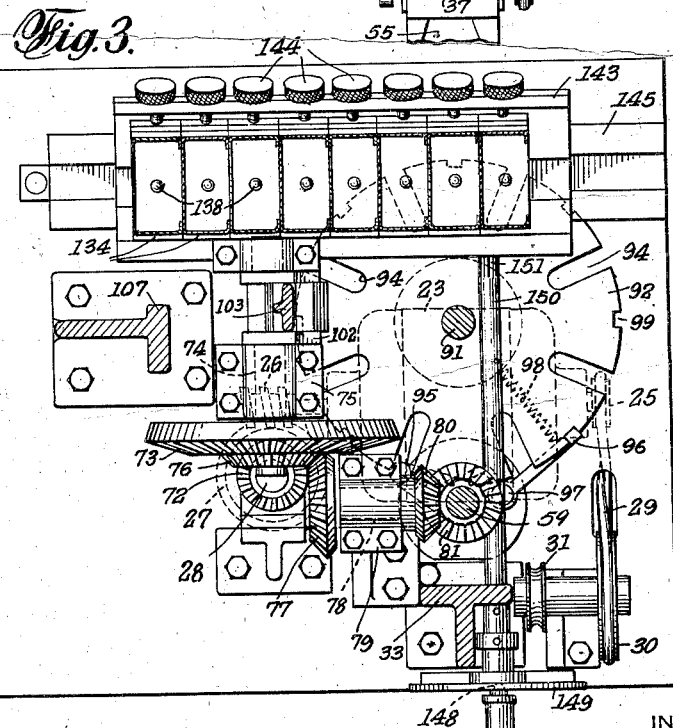
Fig. 3 is a cross-sectional view as taken along the line 3—3 of Figure 1.
Figure 9:
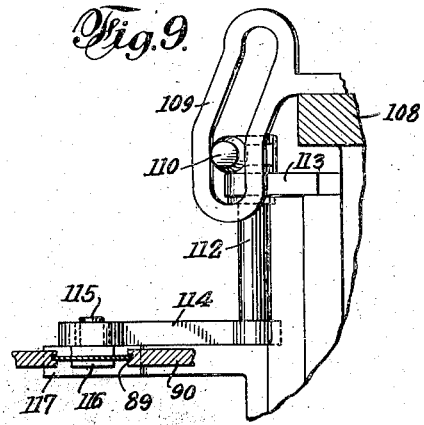
Fig. 9 is a cross-sectional view of the ticket positioning means as taken along the line 9—9 of Figure 4.
Figure 10:
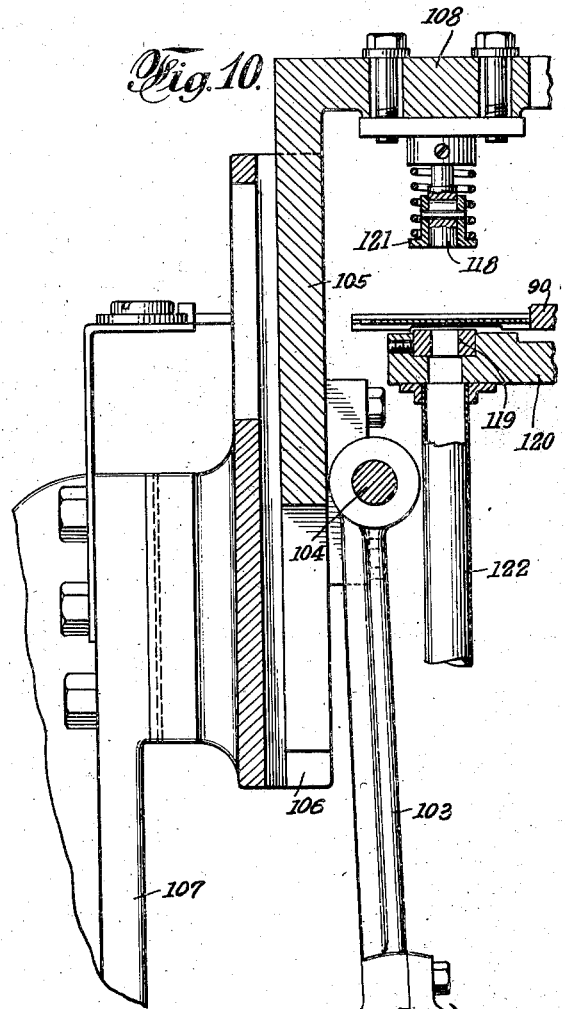
Fig. 10 is a similar view of the ticket punching mechanism and the drive means for the head which carries the punch means, ticket imprinting, and ejecting means, said view being taken along the line 10—10 of Figure 4.

The cam shaft 59 is driven from the motor driven shaft 28. One manner in accomplishing this drive is best shown in Figures 1 and 3 and comprises a bevel pinion 72 on the shaft 28 meshing with a bevel gear 73 on a shaft 74 carried by a bracket 75. Also carried by the shaft 74 is a miter gear 76 meshing the miter gear 77 on the shaft 78 bracketed at 79. The shaft 78 is also provided with a miter gear 80 in mesh with the miter gear 81 on the cam shaft 59.

Between the brushes 38 and 39 there is positioned a shear plate 82 cooperating with a knife 83 on a slide 84 movable in a vertical reciprocating path by a cam 85 on the cam shaft 59. On the other side of the brush 39 there is arranged a stop slide 86 guided in a bracket 87 and vertically movable by means of a cam 88 on the cam shaft. The distance between the shear plate 82 and the stop slide 86 is exactly equivalent to the length of one ticket.

In its operation the ticket feed mechanism, shown in Figure 6, after depressing of the abutments 57, will bring a ticket so its leading end will assume a position in abutting relation against the knife 83. When the knife is depressed by its cam 85 the brush 38 and feed wheel 35 will advance the ticket so its leading end is engaged between the brush 39 and the feed wheel 36 which advances said ticket to a position against the stop slide 86. In this position the knife 83 is raised to sever said ticket from a strip of two or more of said tickets, the trailing ticket or tickets being held from advancement by the knife. Upon depression of the stop slide 86 the brush 39 and feed wheel 36 then project the ticket into the guided slot 89 of the ticket transfer wheel 90. Should only one ticket be fed into the machine the knife 82 will perform its function nevertheless.

The ticket transfer wheel 90 is carried by a vertical shaft 91, at the lower end of which is carried a Geneva wheel 92 intermittently rotated by the arm 93 on the cam shaft 59.

In the present instance the ticket transfer wheel 90 is provided with eight radially disposed equally spaced guided slots 89, and therefore the Geneva plate 92 is provided with a similar number of slots 94 for engagement by the roller 95 on the end of the arm 93.

In order to hold the transfer wheel 90 stationary after each intermittent indexing movement, a locking lever 96 pivoted at 97 and spring tensioned as at 98 is arranged to successively engage notches 99 in the periphery of the Geneva wheel 92. The spring 98 serves to hold the locking portion of the lever 96 in position in the notch, and a cam 100 carried by the arm 93 cooperates with an arm 101 on said lever for moving the locking portion out of the notch to free the Geneva wheel for rotation.

After a ticket is fed from the ticket feeding means into the guided slot 89 in alignment therewith, the transfer wheel 90 is indexed toward the left as shown in Figure 4, and will come to rest with that slot in position to be acted upon by means for definitely positioning said ticket in said slot, said mechanism also operating to provide said ticket with a central punched hole; to provide said ticket with an imprint of a checking number; and to eject said ticket from its guided slot into a receiving receptacle.

The shaft 74 is provided with a crankthrow 102, upon which is journaled a connecting rod 103, the upper portion of which is journaled at 104 to a vertical slide 105 movable in the guideway 106 carried by a bracket 107. The slide 105 is provided with an overstanding arm 108.

The gearing ratio between the bevel pinion 72 and the bevel gear 73 is arranged to provide one complete reciprocation of the slide 105 for each indexing of the ticket transfer wheel 90 but the timing is such that when said slide 105 is in its lowermost position, said transfer wheel will be stationary, and during the period of "up" motion of the slide 105 and the first portion of the "down" motion the indexing of the transfer wheel 90 may occur.

The overhanging standing arm 108 is preferably provided with means such as a fixed cam 109 which engages the end 110 of a lever 111 pivoted on the vertical rock shaft 112, which is bracketed at 113 to the bracket 107. The lower end of the rock shaft 112 is preferably provided with a lever 114 having a slotted end in engagement with a pin 115 on a slide 116 guided at 117.

Figure 2:
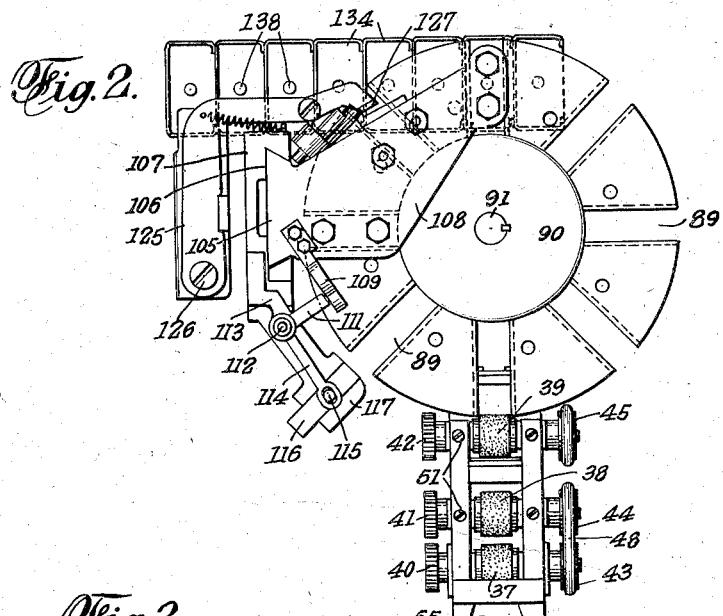
Fig. 2 is a top plan view thereof, certain portions of the lower part of the mechanism being omitted.

From the foregoing it can be seen that from the position shown in Figure 2, downward movement of the slide 105 will, through the medium of the cam 109, cause the slide 116 to move inwardly to engage against the end of the ticket in the slot opposite thereto. This definitely positions said ticket against the closed end of said slide. When the slide 105 moves upwardly the slide 116 is withddrawn ready to act against a ticket in the next oncoming slot.

From this position the transfer wheel 90 is indexed to the next station toward the left where the ticket will be positioned directly beneath the punch 118. Upon the descent of the slide 105 the punch 118 will perforate said ticket at its approximate center. The hollow die 119 carried by a fixed portion 120 of the bracket 107 serves as a shear block for the punch and the spring pressed follower 121 surrounding the punch 118 presses against the ticket to prevent its inadvertent displacement during the operation and especially during the withdrawal of the punch from the hole in the ticket formed thereby. A chute such as 122, may be provided to guide the punching to a collecting receptacle (not shown) to obviate fouling the machine bearings by the punchings.

From this position the transfer wheel is again indexed in the same direction to place the ticket beneath the numbering device 123 carried by the overhanging arm 108. This device with its usual plunger of numbering wheels also has incorporated therein a plunger 124 which when engaged during the descent of the arm 108 operates said wheels to set the numbering of the device to the next consecutive number.

When the transfer wheel assumes the position last indicated, an arm 125 pivoted at 126 engages against the end of the ticket as at 127, being urged by a spring 128. Pivoted to this arm at 129 there is a plate member 130 having an opening 131 normally out of the path of the plunger 124 so that said plunger may impinge against said member 130 to advance the numbering wheels. In order to permit such contact the transfer wheel 90 is provided with openings 132. However, should the slot be void of a ticket, the end 127 of the lever 125 will move inwardly since the spring 128 urges it in that direction and since there is no ticket to retard this movement. In that event the opening 131 in the plate 130 will be in register with the plunger 124 in its downward movement and will not be actuated to advance the incoming wheels.

The portion 120 serves to guide this plate 130 and to carry a spring tensioned platen 133 between which and the numbering wheels, the ticket is engaged during the numbering operation.

Figure 11:
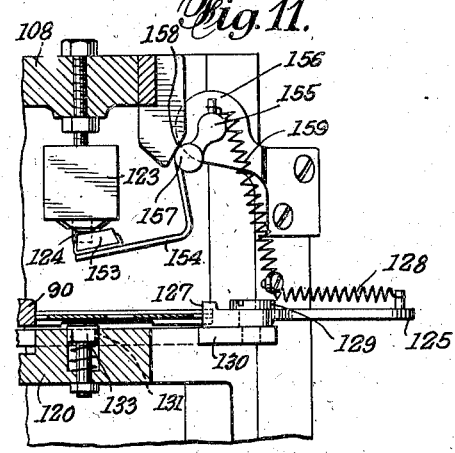
Fig. 11 is a fragmentary vertical sectional view as taken along the line 11—11 of Figure 4, showing the ticket imprinting means.
Figure 12:
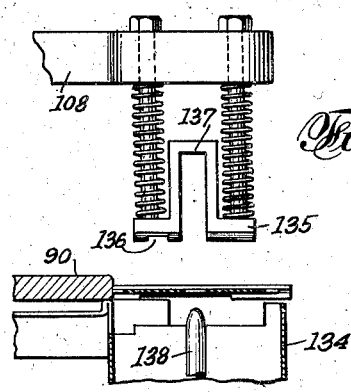
Fig. 12 is a similar view as taken along the line 12—12 of Figure 4, showing the ticket ejecting means.

The numbering wheels are inked by a pad 153 carried on arm 154 pivoted at 155 on a fixed bracket 156. The arm 155 has a portion 157 engaging the cam face 158 carried by the overstanding head 108. A spring 159 serves to maintain the portion 157 against the cam face 158 and to urge the inking pad 153 against numbering wheels. This is best seen in Figure 11. When the slide 105 is in its uppermost position the pad 153 contacts the numbering wheels to ink them, and as the slide 105 moves down the cam face 158 engages the portion 157 to rock the arm 154 which carries the pad 153 out of the path of movement of the inking device 123.

When the last mentioned operation has been accomplished the transfer wheel is again indexed so that the ticket assumes a position over a receiving receptacle 134, and when the slide 105 again moves down, the ticket in the guided slot will be pushed downwardly therefrom by means of a spring tensioned ejecting member 135. In order not to smudge the imprint previously made, said member is grooved as at 136 so as not to contact the ticket at that point, and is further formed with a deep offset portion 137 so as not to contact the rod 138 positioned in the center of the receiving receptacle and over which the ejected ticket is pushed to fall by gravity to the bottom of the receptacle 134.

It is desirable to apprise the attendant when the receptacle is full or nearly so, and for this purpose a switch 139 is mounted in the cabinet 21 and electrically connected to means such as the visible signal 140 which may be viewed from the outside of the cabinet. This switch 139 is normally open and is closed to light the signal 140 when a sufficient number of tickets are in the receptacle 134 to act against the spring 141 to cause the rod 142 to close the mentioned switch 139.

In order to provide the machine with sufficient capacity for tickets for a full day, or week, or other desired period, a multiplicity of receptacles 134 is provided. These are arranged so they may be consecutively positioned beneath the ticket ejecting station. These receptacles are mounted in a slide 143 and held in position therein by means of screws 144. The slide 143 is guided as at 145 and to insure proper positioning of the receiving receptacles in the slide 143, and in relation to the ejecting station, each of said receptacles may be provided with a teat engageable in a recess as shown at 146.

When the attendant desires to displace a filled receptacle with the next empty one he merely pulls on the handle 147 to withdraw the pin 148 from a registering opening in the plate 149, and rotates said handle one complete revolution. The handle 147 being fixed to the shaft 150, said shaft will also rotate one revolution and the pinion teeth 151 on the end of said shaft having engagement with the rack teeth 152 on the slide 143, will move said slide so the next empty receptacle is positioned directly beneath the ticket ejecting station. Any inaccuracies due to back-lash between the teeth 151 and 152 will be compensated for by the accurate positioning of the slide 143 by the detent 146.

The cabinet 21 of course is made of sufficient width to accommodate the slide 143 in any of its positions.

In the form of the invention shown in Figures 13 to 19 inclusive the ticket feeding means previously described may be incorporated with the exception that the severing of the tickets by the knife 83 may be accomplished at a point beyond the last brush 39. In this form of the invention the stop slide 86 is positioned in relation to the knife 83 as heretofore described but the punching and numbering stations are positioned between said stop slide and the severing knife. The punch 118 is preferably actuated from above and the numbering device 123 preferably positioned to be operable from below.

While no motivating mechanism has been shown in the disclosure of this alternate form of machine, the principle of operation should be apparent without said disclosure which should be clearly understood from the drawings and the following detailed description.

In the previously described embodiment of the invention the ticket after leaving the feed mechanism, described a semi-circular path. In the alternate form to be described the ticket is carried in a straight line from the said mechanism to the receiving receptacle.

The ticket is brought to a position against the stop 86 as shown in Figure 13 in the manner previously described. While in this position it is provided with a hole by the punch 18 and numbered by means of the numbering mechanism 123. It is gripped at its forward end by a clamp 200 mounted in a slide 201. The ticket is advanced from this position to the position shown in Figure 15 when the stop slide 86 is depressed and the clamp 200 moved along its slideway 201, to this position where the opposite forward edge of the ticket may be gripped by a clamp 202 movable in a slideway 203. When in this position the clamp 200 is opened and moved back toward the left to its original position where it is again ready to grip the forward end of another ticket.

Figure 15:
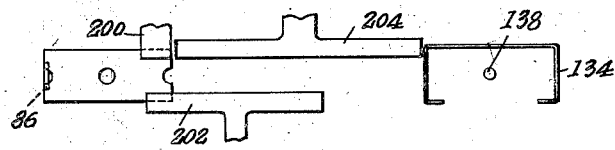
Figure 16:
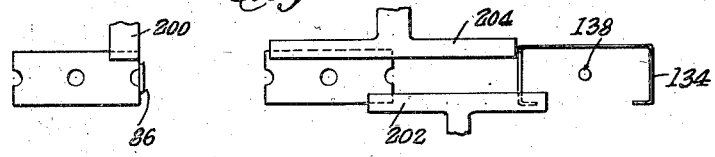
Figure 17:
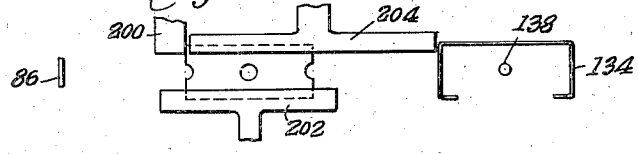

From the position shown in Figure 15 the ticket is moved to the next succeeding position shown in Figure 16 by moving the clamp 202 toward the right. When in this position the ticket will be clamped by another stationary clamp 204. The clamp 202 then is opened and moved back toward the left to its original position where it is ready to grip a ticket brought to it by the clamp 200. When moved to this position as shown in Figure 17 it again grips the ticket but this time at a medial portion of the clamp as shown.

Figure 18:
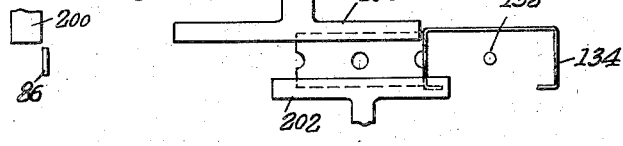
Figure 19:
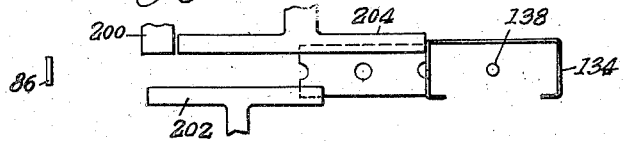

The clamp 204 is then opened and the clamp 202 again moves toward the right to transfer the ticket to the position shown in Figure 18 at which point the clamp 204 again grips the ticket to hold it in this position while the clamp 202 again recovers to its initial position as shown in Figure 19. From this position, upon the opening of the clamp 204, movement toward the left of the clamp 202 will position the ticket directly over the receptacle 134 and when said clamp 202 is opened the ticket will drop into said receptacle and over the stringing rod 138 thereof.

The foregoing description of course describes only the movement of one ticket during the various movements of the several clamps but it is apparent that successive incoming tickets may be in this manner efficiently and effectively transferred from the ticket feeding means to the receiving receptacle.

While the foregoing specification is quite detailed, it should be apparent to skilled persons that many changes in the mechanism may be made without departing from the true spirit and general scope of the invention as hereinafter claimed. Hence, interpretation of the following claims should be based on the prior art and not on this specific disclosure.

Having thus described the invention, what is claimed as new and desired to secure by Letters Patent, is:

1. In a machine of the character described, strip ticket feeding means comprising plural pairs of feed rolls and rotary brushes, means for separating the first of said rotary brushes from its cooperating feed roll, abutments in the path of a ticket and between the first two feed rolls, means for moving said abutments out of the path of the ticket, a shear plate between the last two brushes, and a ticket severing knife cooperatively engaged with said shear plate for severing the leading ticket from a strip passing through said feeding means.

2. In a machine of the character described, a ticket transfer wheel, means for indexing said wheel, means for positioning a ticket from a strip in said wheel comprising ticket feeding means, ticket severing means, means for retarding the movement of said ticket through said feeding means during the indexing movement of said transfer wheel, said last mentioned means comprising abutment means having engagement with the leading end of the ticket, and means for moving said abutment means from the path of said ticket.

3. A machine of the character described comprising a ticket transfer wheel, means for intermittently indexing said wheel, means for feeding a ticket into the wheel, means for punching a hole into said ticket at one index station of said wheel, means for imprinting a number on said ticket at another index station and means for ejecting said ticket from said index wheel at still another index station.

4. A machine of the character described comprising a ticket transfer wheel, means for intermittently indexing said wheel, means for feeding a ticket into the wheel, means for definitely positioning said ticket in said wheel, means for punching a hole into said ticket at one index station of said wheel, means for imprinting a number on said ticket at another index station, and means for ejecting said ticket from said index wheel at still another index station.

5. A machine of the character described comprising a ticket transfer wheel, means for intermittently indexing said wheel, means for feeding a ticket into the wheel, means for punching a hole into said ticket at one index station of said wheel, means for imprinting a number on said ticket at another index station, means for ejecting said ticket from said index wheel at still another index station, and means for receiving a ticket so ejected.

6. A machine of the character described comprising a ticket transfer wheel, means for intermittently indexing said wheel, means for feeding a ticket into the wheel, means for punching a hole into said ticket at one index station of said wheel, means for imprinting a number on said ticket at another index station, means for ejecting said ticket from said index wheel at still another index station, and means for receiving a ticket so ejected, said last mentioned means comprising a plurality of receptacles adapted to be successively positioned to receive the mentioned ticket.

7. In a machine of the character described, a ticket transfer wheel, means for intermittently indexing said wheel, a slide movable up and down in relation to said wheel, means on said slide for punching a hole in a ticket carried by said wheel, and means on said slide for simultaneously imprinting on the face of another ticket carried by said wheel a number comparable with the serial number of said last mentioned ticket.

8. In a machine of the character described, a ticket transfer wheel, means for intermittently indexing said wheel, a slide movable up and down in relation to said wheel, means on said slide for punching a hole in a ticket carried by said wheel, means on said slide for simultaneously imprinting on the face of another ticket carried by said wheel a number comparable with the serial number of said last mentioned ticket, and means on said slide for simultaneously ejecting a third ticket from said wheel.

9. In a machine of the class described, ticket transfer means, a ticket imprinting device having numbering wheels, means for moving said imprinting device to print a number upon the face of a ticket positioned in said transfer means and beneath the imprinting device, and means operable only when a ticket is present in said wheel, for advancing said numbering wheels to the next successive number.

10. A device of the character described, comprising ticket feeding means, means for punching a hole in a ticket, means for imprinting a number on the face of said ticket, means for storing said ticket, and means for intermittently advancing said ticket from the feeding means to the storing means, said advancing means comprising a plurality of reciprocating clamp members.

11. In a machine of the character described, strip ticket feeding means comprising a rotary feed roll, a rotary brush actively associated therewith, means to rotate the brush and the roll simultaneously, vertically movable slide means carrying said brush, means for raising the said slide means to separate the brush from the feed roll, abutments in the path of a ticket about to enter the feeding means to facilitate timing of the ticket through the machine, and means simultaneously to remove the abutment from the path of the ticket and to permit the brush to descend into ticket feeding cooperation with the feed roll to advance the ticket.

12. In a machine of the character described, strip ticket feeding means comprising a rotary feed roll, a rotary brush actively associated therewith, means to rotate the brush and the roll simultaneously, vertically movable slide means mounting said brush, abutments in the path of a ticket about to enter the feeding means to facilitate timing of the ticket through the machine, resilient means tending normally to retain the brush in operative relation with its roll and similar means tending normally to retain the abutments depressed out of the path of the ticket, and means simultaneously to raise the slide means and its brush to non-operative position and to raise the abutments into the path of a ticket.

GEORGE D. ROEDELS.